July 15, 1941.    H. M. STROBEL    2,249,582
THERMOSTAT
Filed Oct. 27, 1939    2 Sheets-Sheet 1
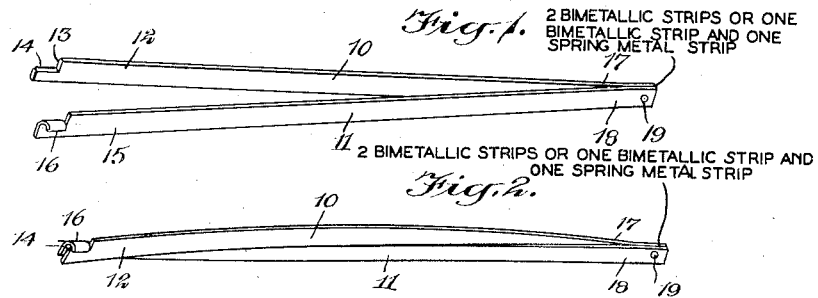
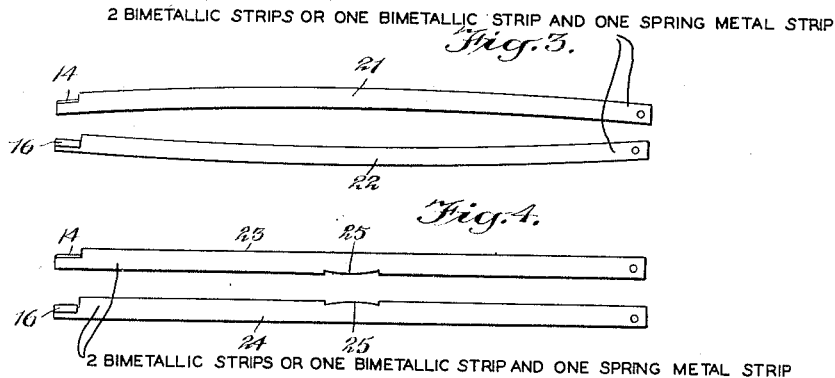
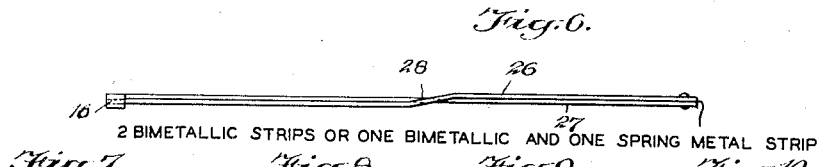
WITNESSES
INVENTOR
Howard M. Strobel
BY
Munn, Anderson & Liddy
ATTORNEYS July 15, 1941.                H. M. STROBEL                2,249,582
                                 THERMOSTAT
                          Filed Oct. 27, 1939            2 Sheets-Sheet 2
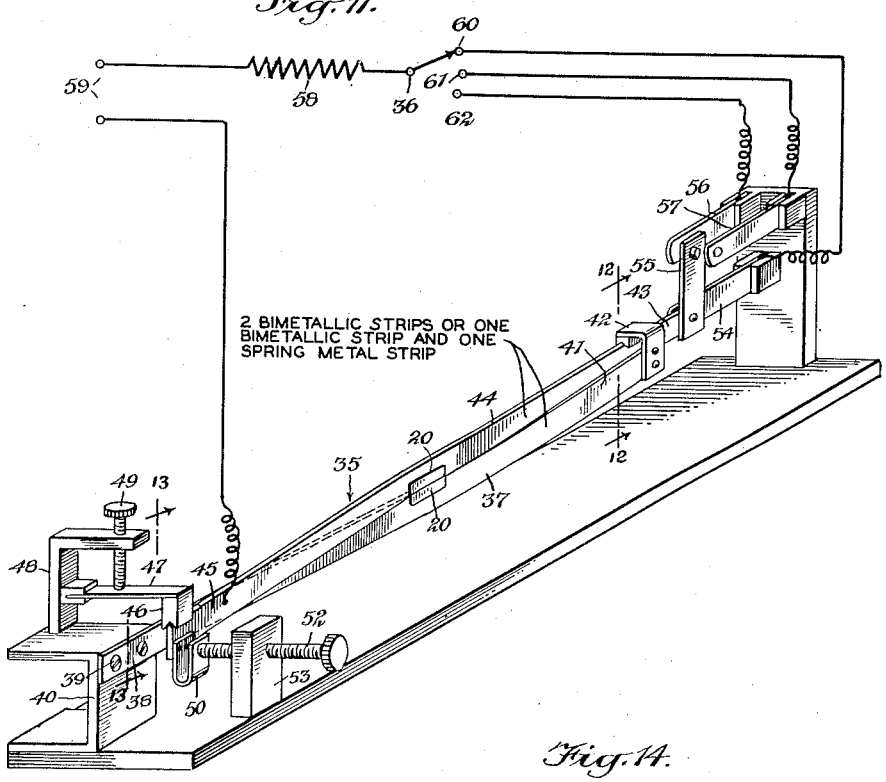
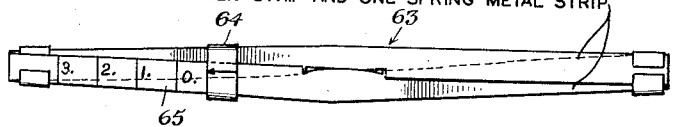
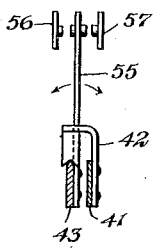
WITNESSES
INVENTOR
Howard M. Strobel
BY
ATTORNEYS Patented July 15, 1941

2,249,582

UNITED STATES PATENT OFFICE 2,249,582

THERMOSTAT

Howard M. Strobel, Allegany, N. Y.

Application October 27, 1939, Serial No. 301,543

24 Claims. (Cl. 297—15)

This invention relates to thermostatic control devices and more particularly to snap action type of thermostats.

The present invention contemplates a thermostat which may be easily constructed from flat or developable thermostatic or bimetallic materials, one which requires no supporting devices in its simplest embodiment, and of such design and construction as to be easily mounted or installed for use in operating mechanical devices, such as valves, dampers, levers and for controlling electrical circuits.

The thermostat according to my invention includes the following special advantages. It can be made in very large sizes, due to its fundamentally simple construction. It has a relatively large deflection and is capable of exerting a relatively strong force in proportion to its size, thereby making it applicable for the operation of devices requiring a snap action, such for instance as is desired in the operation of dampers, valves and other closely analogous devices.

The foregoing and other advantages of the invention will appear from the embodiments thereof hereinafter described by way of example, defined as to scope in the appended claims, and illustrated as to variations in the accompanying drawings, in which—

Fig. 1 is a perspective view of the simplest form snap thermostat as it looks before its components are flexed into operative relation.

Fig. 2 is a perspective view of the thermostat shown in Fig. 1 after the components thereof are brought into their operative relation.

Fig. 3 is a side view of members cut in longitudinally curved form to constitute a further modification of the invention.

Fig. 4 is a side view of two members of a thermostat showing a modified manner in which to construct the pivoting center portion of said members.

Fig. 5 is a top view of the thermostat constructed of the members shown in Fig. 4.

Fig. 6 is a top view of a thermostat constructed of further modified forms of component members.

Fig. 7 is a cross section showing the manner of applying caps of metal harder than that of the thermostatic metals in order to reduce friction at the pivoting center portions of the members constituting the thermostat.

Fig. 8 is a perspective view of one form of associating the adjacent unfixed ends of a thermostat.

Fig. 9 is a perspective view of a still further form for associating the adjacent unfixed ends of a thermostat.

Fig. 10 is a perspective view of an additional form for associating the adjacent unfixed ends of a thermostat.

Fig. 11 is a perspective view of an electric switch selected to illustrate one form of thermostat constructed in accordance with the invention shown applied thereto, for controlling an electric circuit.

Fig. 12 is a section taken approximately on the line 12—12 of Fig. 11.

Fig. 13 is a section taken on the line 13—13 of Fig. 11.

Fig. 14 is a perspective view of a still further modified form of thermostat which is adjustable to operate at different predetermined degrees of temperature.

Generally stated the thermostat and modifications of the present invention are of the snap type or toggle joint principle so that the bending forces generated by the thermostatic material with temperature changes are resisted until the generated forces become strong enough to bring the toggle joint to its point of instability, and since its resistance to change approaches zero at this point of instability, the slightest further change of temperature in the same direction causes the toggle joint to reverse its position.

Referring now more particularly to Figs. 1 and 2 of the drawings, it will be apparent that in its simplest form the snap action thermostat consists of two components or members 10 and 11. The members 10 and 11 consist of elongated flat pieces or strips or bars of thermostatic or bimetallic material, such for instance as brass-nickel steel. In other words a thermostatic member consists of a lamina of brass and a lamina of nickel steel or other suitable metals having relatively different coefficients of expansion. In the present instance both members 10 and 11 are of thermostatic material and are joined together with the sides having the metal of higher coefficient of expansion facing the same way, so that for a given temperature change both component strips tend to curve in the same direction and assist each other in deflecting the thermostat. It is to be understood however, that one member may be constructed from thermostatic material and the other may be constructed from suitable material having inherent resiliency or springiness to serve as a stressing or tension member in conjunction with the thermostatic member. The end 12 of the member 10 has a notch 13 and a knife edge 14. The end 15 of the member 11 is cut and bent to provide a hook 16.

The two members 10 and 11 have their adjacent ends 17 and 18, respectively, joined or fastened rigidly to each other by any suitable means, as by riveting, soldering, welding or brazing. As shown, said ends 17 and 18 are riveted as at 19. The member 10 is entwined or crossed edgewise over the member 11 and the edge 14 on the end 12 of the member 10 is then engaged with the hook 16 on the adjacent end 15 of the member 11. The members 10 and 11 in being crossed edgewise or in being made to intersect each other bring the lower longitudinal edge of member 10 in contactual engagement with the upper longitudinal edge of the member 11 midway between their ends as shown in Fig. 2. This permits the member 10 to have pivotal movement with respect to the member 11 in the center while still remaining substantially in the same plane, with the opposite ends of the thermostat restrained as to outward or spreading movement while still allowing the canting or rotatory movement of either the end 12 or 15 with respect to each other, or similar movement of both ends 12 and 15 according to the manner in which the thermostat is actively mounted for use.

As shown in Fig. 2 the thermostat is in its neutral position or at a point of instability. At a normal temperature the thermostat would tend to assume a curved condition with the concave side of each strip possessing the thermostatic material having the higher coefficient of expansion. Under such conditions, when the thermostat is heated, the material on the concave side of each strip expands at a more rapid rate than on the convex side, and each member tends to bend in the same direction and so try to reverse its curvature. It is restrained from doing so by the toggle-joint principle inherent in this type of construction, and so builds up stresses until sufficient force exists to snap the thermostat through the position of instability. On cooling the reverse action will take place.

In order to make the snap thermostat sensitive to temperature changes it is desirable that all pivots are properly adjusted to eliminate as far as possible binding and resulting undue friction which may cause erratic action of the thermostat, knife edges may be resorted to, such as the knife edge 14, and further such knife edge and also the contacting edge portions of the members may be capped by a hand steel cap, as illustrated at 20 in Figs. 7 and 11.

Further possibility of friction due to rubbing at the center pivot between the members can be eliminated by various means. To this end, as shown in Fig. 3, the members 21 and 22 respectively are cut so that the longitudinal edges thereof are curved. It will be obvious, however, that the curvature of the longitudinal edges should not be so great as to fail to permit contact of the edges at the central portion when the strips 21 and 22 are crossed edgewise and the ends joined.

A further modification to reduce friction at the center pivot of the members is shown in Fig. 4. Each of the members 23 and 24 is notched or cut away as at 25, so that the edges at the center touch at but one point, thus reducing the chances of the thermostat having to "work" portions of the metal when it is in operation.

In Fig. 5 the members 23 and 24 are shown associated with each other for snap action in a neutral position or position of instability. This is a top view of the thermostat.

In Fig. 6 a further modification is shown for preventing the members designated 26 and 27 respectively from binding at the central pivot. The member 26 is bent to produce a portion 28 at the center disposed at an angle with respect to the remaining portions, so that on assembling the members to constitute a thermostat the edges at the pivot point cross at a greater angle than in the case of straight strips or members. It is to be understood that one or the other of the members may be bent either right or left as the case may be. In order to avoid unnecessary working of the thermostatic material of the strips as they rock or pivot about the central contact point it is preferred that at least one of the ends be permitted a limited degree of rotatory movement. However, it will be obvious that if the strips are made relatively long with respect to their width all of the ends could be rigidly joined, since the inherent flexibility of the long strips would still permit the central portion of the members to have rotatory pivotal movement relative to one another.

As hereinbefore mentioned it is desirable that the end or ends of one of the members be allowed some degree of freedom as to rotation with respect to the companion member. This allows the two members to assume their reversed curvature position without trying to "work" the material of the members. In Figs. 1 to 6 inclusive and Fig. 8 one of the ends of one member has a hook 16 which engages the knife edge 14 on the adjacent end of the other member, thus keeping the thermostat members under proper stress longitudinally while allowing the end 12 to rotate with respect to the end 15. In Fig. 9 the unfastened ends 12 and 15 respectively are restrained by an S-shape hook 29 which is engaged by the knife edges 30 and 31 respectively. In lieu of the hooks 16 and 29, use may be made of a grooved ring 32 as a further modification, as shown in Fig. 10.

In Figs. 11, 12 and 13 is shown a simple form of snap thermostat 35 constructed in accordance with the invention in which the degree of freedom of one pair of ends is subject to control, as by adjusting the thumbscrew 52. It follows that by screwing down the thumbscrew 52 the freedom of movement of the ends can be prevented, in which case the thermostat operates as if the ends were joined similar to the thermostats illustrated in Figs. 1 to 6 inclusive. The thermostat is shown applied to a switch 36 for controlling an electric circuit. A member 37 has one end 38 rigidly secured as at 39 to a stationary support 40. The opposite end 41 has a hook 42 which is engaged with the adjacent end 43 of the companion thermostatic member 44. The other end 45 of the member 44 is engaged with a block 46 on a spring 47 carried by a stationary support 48, the latter being engaged by an adjusting screw 49 carried by the stationary part 48. The end 45 has connected therewith a U-shape spring 50 swively connected as at 51 with one end of an adjusting screw 52 carried by a stationary support 53. The deflecting end 43 is engageable with and disengageable from a stationary contact 54 by the pivotal movement of said end 43 for opening and closing a circuit by deflection action. The end 43 has a small strip 55 joined thereto substantially at right angles to the strip 44, so as to magnify the snap-rotation action of the end 43 resulting from the snap-deflection action of the thermostat as a whole. The snap-rotation and snap-deflection motions are both imparted to the upper end of the arm or strip 55 which thus operates between the stationary contacts 57 and

56, so that when a change in temperature causes the thermostat to operate, if switch 36 is at 61 the circuit is opened by contacts 55 and 57, and if switch 36 is at 62 the circuit is closed by closing of contacts 55 and 56. The extension piece 55 may be of thermostatic material so oriented with respect to its sides of high and low coefficient of expansion metal as to have a bending deflection opposite to that of the thermostat members 44 and 37 for any given temperature change. The effect of this will be to counteract the bending-deflection of the thermostat that occurs prior to the snap-deflection action which releases the accumulated thermal bending stresses. As a result, only the snap-action motion will be conveyed to the contact end of the member 55, which would be an advantage in many applications. By the use of switch 36 the circuits can be placed in series with the electrical load 58 and connected across the line voltage 59. The switch 36 includes contacts 60, 61 and 62 permitting a choice of operations. That is, on contact 60, the circuit will be completed when, due to an increase in temperature, the thermostat operates and closes the contacts on 43 and 54. When switch 36 is at 61, and the free end 43 of the thermostat is flexed to the right at normal temperatures, then the circuit is normally closed by the contacts on arm 55 and support 57; hence, when the temperature increases sufficiently to operate the thermostat, the contacts on 55 and 57 are opened rapidly, thus switching off power to the load 58. With switch 36 on contact 62, operation of the thermostat will close the circuit through contacts on 55 and stationary support 56.

The screws 49 and 52 together with the springs 47 and 50 constitute means for varying the stressing forces of the thermostat which thereby control the deflection characteristics of the thermostat. In Fig. 14 is shown a thermostat 63 constructed in accordance with the invention which includes an adjustable U-shaped spring 64 slidably engaged with the thermostatic members as a modified form of means for varying the spring force which limits the freedom of rotation of the free ends of the thermostat and thereby controls the deflection characteristics of the thermostat by adjusting the spring tension of the members. One of the members has certain indicia 65 to indicate deflection and snap action at various degrees of temperature.

I claim:

1. A thermostat consisting of two flat strips of thermostatic material having two adjacent ends rigidly fastened together and the remaining two adjacent ends loosely connected, said strips crossing each other edgewise by virtue of the inherent flexibility thereof to produce a stressed structure having a point of instability about which a snap action occurs, deflection of said strips being caused by said snap action after the point of instability has been reached while the strips are subjected to temperature change.

2. A snap action thermostat consisting of two bimetallic strips having two adjacent ends rigidly joined and being crossed edgewise to stress said strips, the remaining adjacent ends of the strips having cooperative means restraining said last named ends against translational movement relative to each other while permitting rotatory movement of at least one end.

3. A snap action thermostat consisting of two bimetallic strips having two adjacent ends rigidly joined, said strips being notched and being crossed edgewise at the notched portions to stress said strips, the remaining ends of the strips being adjacent and having cooperative means restraining said last named ends against translational movement relative to each other while permitting rotatory movement of at least one end.

4. A snap action thermostat consisting of two strips, there being a thermostatic strip and a stressing strip having two adjacent ends rigidly joined, said strips being crossed edgewise to stress said strips, the remaining ends of the strips being adjacent and having cooperative means restraining said last named ends against translational movement relative to each other while permitting rotatory movement of at least one end.

5. A thermostat consisting of two flat strips of thermostatic material having two adjacent ends rigidly fastened together and the remaining two adjacent ends loosely connected by means of a hook on one of the ends engaged with an edge of the other end, said strips crossing each other edgewise by virtue of the inherent flexibility thereof to produce a stressed structure having a point of instability about which a snap action occurs, deflection of said strips being caused by said snap action after the point of instability has been reached while the strips are subjected to temperature change.

6. A snap thermostat consisting of two elongated flexible members of thermostatic stock, one of said members being bent in its length to provide a portion angularly disposed with respect to the remaining portions thereof, two adjacent ends of said members being rigidly joined, the members being crossed edgewise with the angularly disposed portion of the one member in contact with the other member, the remaining adjacent ends of the members having cooperative means for restraining said last ends against translational movement relative to each other while permitting limited rotatory movement of at least one of said last ends upon deflection of said members.

7. A thermostat of the toggle joint type consisting of two heat responsive members which intersect each other so that one longitudinal edge of one member contacts one longitudinal edge of the other member thereby allowing pivotal movement of one member on the other, two adjacent ends of the members being rigidly joined, and the two remaining adjacent ends being restrained by suitable means against translational movement relative to each other while permitting limited rocking movement of at least one of said last ends.

8. A thermostat consisting of a flexible thermally responsive strip member and a flexible stressing strip member, said members crossing each other edgewise so that one longitudinal edge of one member contacts one longitudinal edge of the other member, two ends of said members being adjacent and joined and the two remaining ends of said members being adjacent, means restraining said last named ends against translational movement relative to each other and permitting said members to be bowed in the same direction, whereby at least one of said restrained ends may have a limited rocking movement when said members are subjected to a sufficient change in temperature.

9. A thermostat comprising two flat strips of thermostatic material being provided with a suitable centrally located edgewise mutually pivotal point, and having cooperative means at each pair of ends for maintaining the strips in a state of edgewise stress about said pivotal point while still permitting a limited degree of rotatory movement of the ends to produce a structure having a point of instability about which snap action occurs, the construction being such that the combination tends to buckle at normal temperatures with the thermostatic metal having the higher coefficient of expansion on the inner side, so that on increasing the temperature reversing stresses accumulate until a condition of instability is reached, and an abrupt change in curvature and deflection takes place.

10. A snap action thermostat consisting of two bimetallic strips of flat stock having each pair of adjacent ends restrained from spreading while permitting limited rotatory movement of at least one of the ends, said strips being provided with a suitable centrally located edgewise pivotal point.

11. A snap action thermostat consisting of two bimetallic strips of flat stock disposed substantially parallel and in substantially the same plane having each pair of adjacent ends restrained from spreading while permitting limited rotatory movement of at least one of the ends, said strips being provided with a suitable centrally located edgewise pivotal surface.

12. A thermostat consisting of two flat strips of thermostatic material disposed substantially parallel and having two adjacent ends rigidly fastened together and the remaining two adjacent ends loosely connected by means restraining the ends against translational movement relative to each other while permitting rotatory movement of at least one end, said strips crossing each other edgewise by virtue of the inherent elasticity thereof to produce a structure having a point of instability about which snap action occurs, snap deflection of said strips being caused by snap action release of accumulated thermal bending stresses, after the point of instability has been reached while the strips are subjected to a temperature change.

13. A thermostat consisting of two flat strips of thermostatic material disposed substantially parallel as to form and similarly as to thermostatic material having two adjacent ends rigidly fastened together and the remaining two adjacent ends loosely connected but restrained from spreading edgewise, said strips crossing each other edgewise by virtue of the inherent elasticity thereof to produce a structure having a point of instability about which snap action occurs, snap deflection of said strips being caused by snap action release of accumulated thermal bending stresses after the point of instability has been reached while the strips are subjected to a temperature change.

14. A snap action thermostat consisting of two flat strips at least one of which is of bimetallic material having two adjacent ends rigidly joined and being crossed edgewise with the remaining adjacent ends joined to stress said strips.

15. A snap action thermostat consisting of two flat bimetallic strips having two adjacent ends restrained from spreading while permitting limited rotatory movement of at least one pair of ends and being crossed edgewise to stress said strips, the remaining adjacent ends of the strips having cooperative means for restraining said last ends against translational movement relative to each other while permitting rotatory movement of at least one of said last ends.

16. A snap action thermostat consisting of two flat bimetallic strips having two adjacent ends restrained from spreading while permitting various degrees of limited rotatory movement of one end and being crossed edgewise to stress said strips, the remaining adjacent ends of the strips having cooperative means for restraining said last ends against translational movement relative to each other while permitting rotatory movement of at least one of said last ends.

17. A snap action thermostat consisting of two bimetallic strips of flat stock having two adjacent ends restrained from spreading while permitting limited rotatory movement of at least one end and being crossed edgewise and the remaining adjacent ends of the strips having cooperative means for restraining said last ends against spreading translational movement relative to each other while permitting rotatory movement of at least one of said last ends, the combination then being stressed or buckled by inserting centrally between the edges a separating bearing surface.

18. A snap action thermostat consisting of two bimetallic strips of flat stock having two adjacent ends rigidly joined, said strips being notched centrally and being crossed edgewise at the notched portions to permit bearing or pivotal surfaces to stress said strips, the remaining adjacent ends of the strips having cooperative means for restraining said last ends against spreading translational movement relative to each other while permitting rotatory movement of at least one of said last ends.

19. A thermostat consisting of two flat strips of thermostatic material having the two pairs of adjacent ends restrained as to spreading edgewise but permitting a limited degree of rotatory movement, said strips crossing each other edgewise in the central section and permitting stressing by virtue of the inherent elasticity thereof to produce a structure having a point of instability about which snap action occurs, deflection of the ends of said strips being permitted by snap action after the point of instability for the accumulating stresses has been reached while the strips are subjected to temperature changes, and adjustable means for varying the forces restraining the ends of the strips so that snap action operation of the thermostat will occur at a predetermined degree of temperature.

20. A snap action thermostat consisting of two flat strips, there being a thermostatic strip and a stressing strip having each pair of adjacent ends restrained as to spreading edgewise movement but permitting a limited degree of rotatory movement in their operative position, one pair of ends being transposed with respect to the other by crossing the strips edgewise thus stressing the said strips when the ends are restrained to said operative position.

21. A thermostat consisting of two flat strips of thermostatic material having two adjacent ends rigidly fastened together and the remaining two adjacent ends loosely connected by means of a hook on one of the ends engaged with an edge of the other end, said strips crossing each other edgewise and so being stressed by virtue of the inherent elasticity and engagement thereof to produce a structure having a point of instability about which snap action occurs, deflection of said strips being caused by snap action release of accumulating thermal stresses after the point of instability has been reached while the strips are subjected to a temperature change.

22. A snap thermostat consisting of two elongated members of thermostatic stock, one of said members being bent in its length to provide a portion angularly disposed with respect to the remaining portions thereof, two adjacent ends of said members having cooperative means for being restrained from spreading edgewise movement while permitting a limited degree of rotatory movement of one of the ends, the members being crossed edgewise with the angularly disposed portion of the one member in contact with the other member, the remaining adjacent ends of the members having cooperative means for stressing said members by restraining the spreading movement relative to each other of said last ends in such manner that they may have limited pivotal or rotatory movement upon thermal deflection of said members.

23. A thermostat of the toggle joint type consisting of two heat responsive members of thermostatic material whose planes substantially intersect each other so that one longitudinal edge or bearing surface of one member contacts one longitudinal edge or bearing surface of the other member thereby allowing pivotal movement of one member on the other, and the two pairs of adjacent ends being restrained by suitable means to permit limited rocking movement of at least one of said ends while still subjecting the members to an edgewise bending stress about the pivotal point.

24. A snap action thermostat consisting of two bimetallic strips of flat stock one strip having one of its ends rigidly joined to a support and the second strip being crossed edgewise over the first so as to be in contact at some centrally located pivotal point suitably formed and constructed so as to reduce friction, said members being held in a state of stress edgewise about the pivotal point by cooperative means which restrain the adjacent ends of the strips from spreading while still permitting the second strip to have limited rotatory movement, said second strip being provided with an extension member substantially at right angles thereto so as to use to advantage both the snap deflection and the snap rotatory movement thereof.

HOWARD M. STROBEL.